(12) United States Patent
Huang et al.

(10) Patent No.: US 8,339,792 B1
(45) Date of Patent: Dec. 25, 2012

(54) DETACHABLE ADAPTER AND HANDHELD DEVICE

(75) Inventors: Hsiang-Tai Huang, Taoyuan County (TW); Hsi-Kun Chen, Taoyuan County (TW); Chih-Kuang Wang, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 0 days.

(21) Appl. No.: 13/288,971

(22) Filed: Nov. 4, 2011

(51) Int. Cl.
*H05K 1/14* (2006.01)

(52) U.S. Cl. .......................... 361/737; 361/728; 361/730

(58) Field of Classification Search .................. 361/727, 361/730, 737, 752, 796, 800, 679.01–679.04, 361/679.31, 679.55, 679.56, 679.41; 439/271, 439/625, 626, 374, 377, 638; 455/73, 550.1, 455/550.2, 557, 558; 710/1, 2, 100, 300–301, 710/303, 304
See application file for complete search history.

(56) References Cited

U.S. PATENT DOCUMENTS

| | | | | |
|---|---|---|---|---|
| 5,877,975 A * | 3/1999 | Jigour et al. | ..................... | 365/52 |
| 6,721,186 B2 * | 4/2004 | Yang | .............................. | 361/737 |
| 7,226,318 B1 * | 6/2007 | Lee | ................................ | 439/630 |
| 7,396,243 B1 * | 7/2008 | Lai | .................................. | 439/159 |
| 7,661,990 B1 * | 2/2010 | Chiang | .................... | 439/607.35 |
| 2006/0237539 A1 * | 10/2006 | Chang et al. | .................. | 235/441 |
| 2008/0096413 A1 | 4/2008 | Chen | | |

* cited by examiner

*Primary Examiner* — Hung S Bui
(74) *Attorney, Agent, or Firm* — Jianq Chyun IP Office

(57) ABSTRACT

A detachable adapter is adapted to be disposed in a handheld device and adapted to accommodate a memory card. The handheld device includes a socket connector. The memory card has a memory card terminal set. The socket connector has a socket body and a socket terminal set disposed at the socket body. The adapter includes an adapter body, and first, second and third terminal sets. The detachable adapter has an accommodating cavity in which the first terminal set is disposed. The second and third terminal sets are disposed on the adapter body. When the memory card is accommodated in the accommodating cavity, the first terminal set contacts the memory card terminal set. When the adapter body is assembled to the socket body, the second terminal set contacts the socket terminal set. When the adapter body is inserted into an electronic apparatus, the third terminal set contacts an apparatus terminal set.

22 Claims, 7 Drawing Sheets

DETACHABLE ADAPTER AND HANDHELD DEVICE

BACKGROUND OF THE DISCLOSURE

1. Technical Field

The present disclosure relates to an adapter and a handheld device, and more particularly, to a detachable adapter and a handheld device employing the detachable adapter.

2. Background

Handheld devices refer to an electronic device that allows users to carry about and use. The handheld devices usually have a small size and weight so that the users may carry them about. Typical handheld devices include mobile phones, multimedia players, tablet PCs, handheld game consoles or handheld GPS navigators.

Taking the mobile phone as an example, most current mobile phones are provided with a memory card as a data storage device inside the mobile phone. If it is desired to read data in the memory card inside the mobile phone, the data in the memory card may be accessed by using a transmission cable connecting the mobile phone to a computer, or inserting a card reader which accommodates the memory card to a computer, or through wireless transmission (e.g. Bluetooth transmission). However, when the transmission cable, card reader and wireless transmission are not available, the data in the memory card may not be read.

SUMMARY

Accordingly, the present disclosure is directed to a detachable adapter which is adapted to accommodate a memory card and may be connected to a handheld device or an electronic apparatus to read data in the memory card accommodated in the detachable adapter.

The present disclosure is also directed to a handheld device including the detachable adapter, in which the detachable adapter that has been detached from the handheld device is adapted to be connected to an electronic apparatus to read data in the memory card accommodated in the detachable adapter.

The present disclosure provides a detachable adapter adapted to be disposed inside a handheld device and adapted to accommodate a memory card. The handheld device includes a socket connector. The memory card has a memory card terminal set. The socket connector has a socket body and a socket terminal set disposed at the socket body. The detachable adapter includes an adapter body, a first terminal set, a second terminal set and a third terminal set. The adapter body has an accommodating cavity for accommodating the memory card. The first terminal set is disposed in the accommodating cavity. The second terminal set and third terminal set are disposed on the adapter body. When the memory card is accommodated in the accommodating cavity, the first terminal set contacts the memory card terminal set. When the adapter body is assembled to the socket body, the second terminal set contacts the socket terminal set. When the adapter body is inserted into an electronic apparatus, the third terminal set contacts an apparatus terminal set of the electronic apparatus.

The present disclosure provides a handheld device adapted to accommodate a memory card. The memory card has a memory card terminal set. The handheld device includes a device body, a socket connector, and a detachable adapter. The device body has a first accommodating cavity. The socket connector is disposed in the first accommodating cavity. The socket connector has a socket body and a socket terminal set disposed at the socket body. The detachable adapter includes an adapter body, a first terminal set, a second terminal set and a third terminal set. The adapter body has a second accommodating cavity for accommodating the memory card. The first terminal set is disposed in the second accommodating cavity. The second terminal set and third terminal set are disposed on the adapter body. When the memory card is accommodated in the second accommodating cavity, the first terminal set contacts the memory card terminal set. When the adapter body is assembled to the socket body, the second terminal set contacts the socket terminal set. When the adapter body is inserted into an electronic apparatus, the third terminal set contacts an apparatus terminal set of the electronic apparatus.

Based on the description above, the detachable adapter of the present disclosure is adapted to accommodate a memory card and adapted for a handheld device. As such, the user may read data in the memory card accommodated in the detachable adapter by connecting the detachable adapter that is detached from the handheld device to the electronic apparatus, without the use of any additional transmission cable, additional card reader or wireless transmission.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

DETAILED DESCRIPTION

Figure 1:
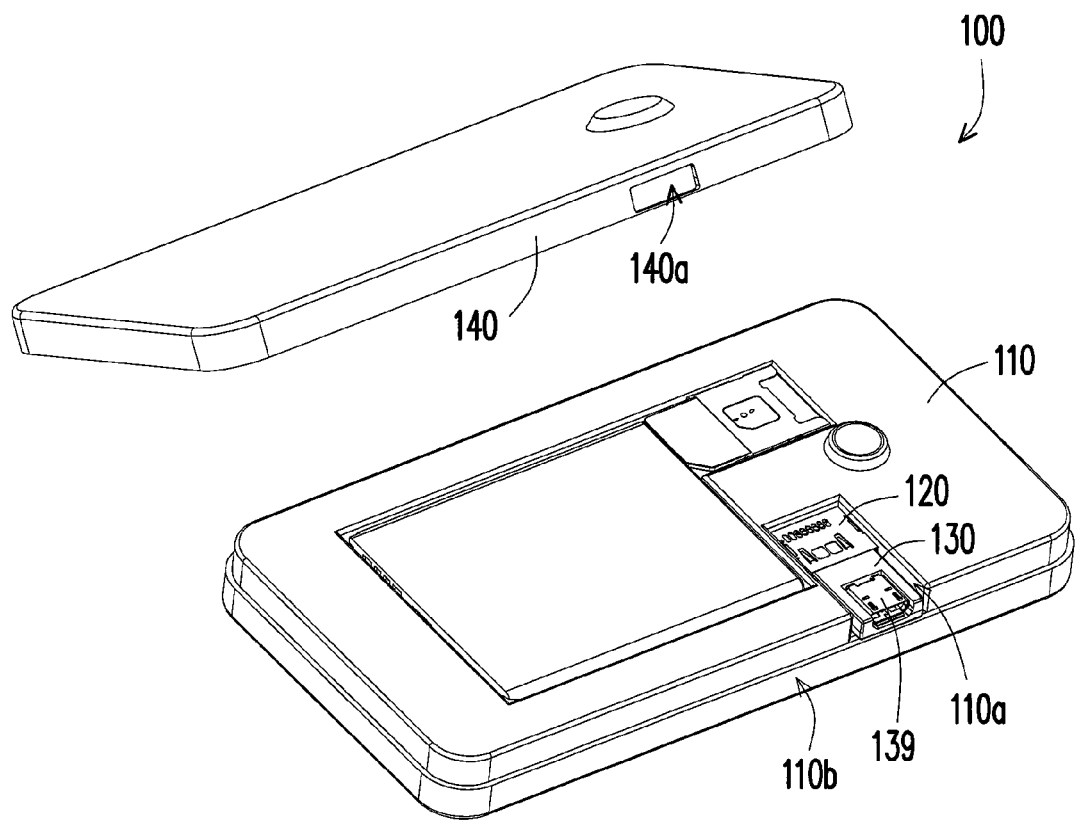
FIG. 1 is a perspective view of a handheld device according to one embodiment of the present disclosure.
Figure 2:
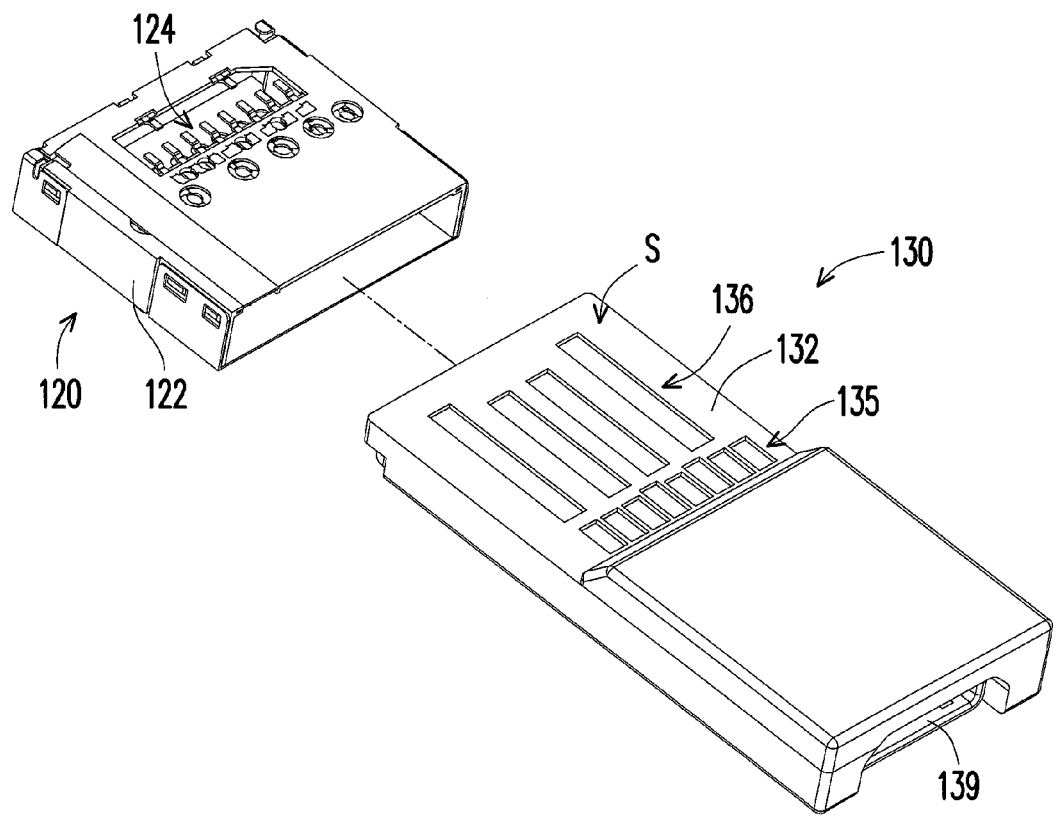
FIG. 2 is an exploded view of the socket connector and detachable adapter of FIG. 1.
Figure 3:
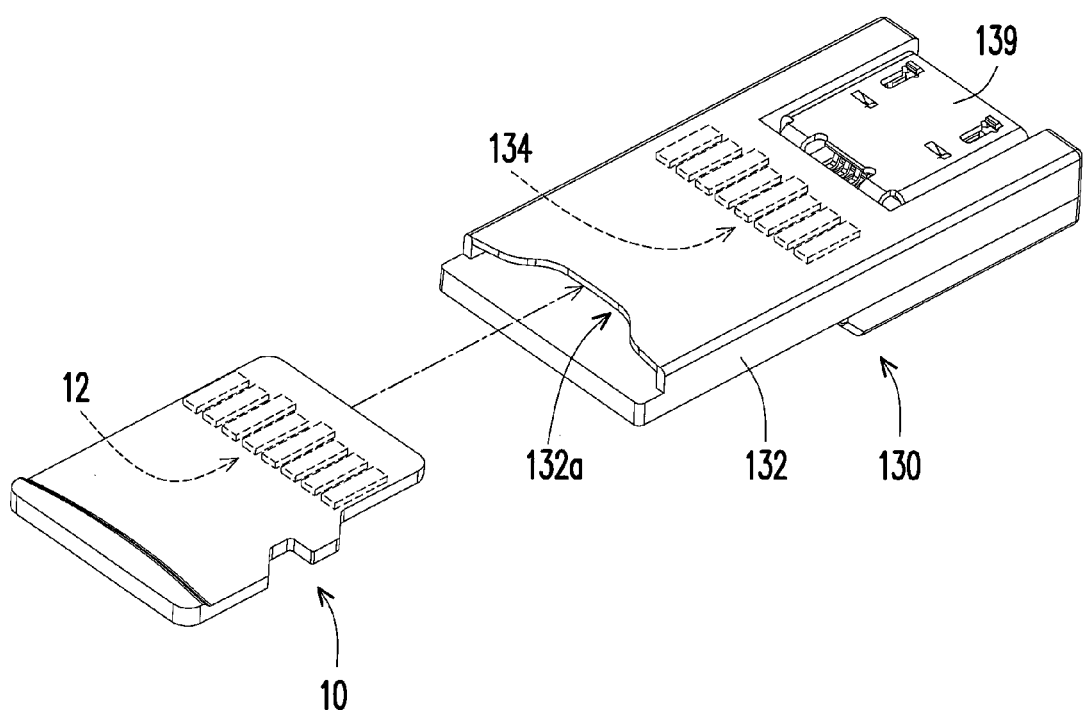
FIG. 3 is an exploded view of the detachable adapter and memory card of FIG. 1.

FIG. 1 is a perspective view of a handheld device according to one embodiment of the present disclosure. FIG. 2 is an exploded view of a socket connector and a detachable adapter of FIG. 1. FIG. 3 is an exploded view of the detachable adapter and a memory card of FIG. 1. Referring to FIG. 1, FIG. 2, and FIG. 3, in the present embodiment, the handheld device 100 is adapted to accommodate a memory card 10. The handheld device 100 may be, for example, a mobile phone, a tablet PC, or a handheld game console. In the present embodiment, the handheld device 100 is exemplarily illustrated as a mobile phone. The memory card 10 has a memory card terminal set 12.

The handheld device 100 includes a device body 110, a socket connector 120, and a detachable adapter 130. The device body 110 includes a first accommodating cavity 110a. The socket connector 120 is disposed in the first accommodating cavity 110a, and has a socket body 122 and a socket terminal set 124 disposed at the socket body 122.

The detachable adapter 130 includes an adapter body 132, a first terminal set 134, a second terminal set 135, and a third terminal set 136. The adapter body 132 has a second accommodating cavity 132a for accommodating the memory card 10. The first terminal set 134 is disposed in the second accommodating cavity 132a. The second terminal set 135 and the third terminal set 136 are disposed on the adapter body 132.

When the memory card 10 is accommodated in the second accommodating cavity 132a, the first terminal set 134 contacts the memory card terminal set 12. When the adapter body 132 is assembled to the socket body 122, the second terminal set 135 contacts the socket terminal set 124. In the present embodiment, the first terminal set 134 may be a micro secure digital (Micro-SD) terminal set, and the second terminal set 135 may also be a Micro-SD terminal set.

Figure 4:
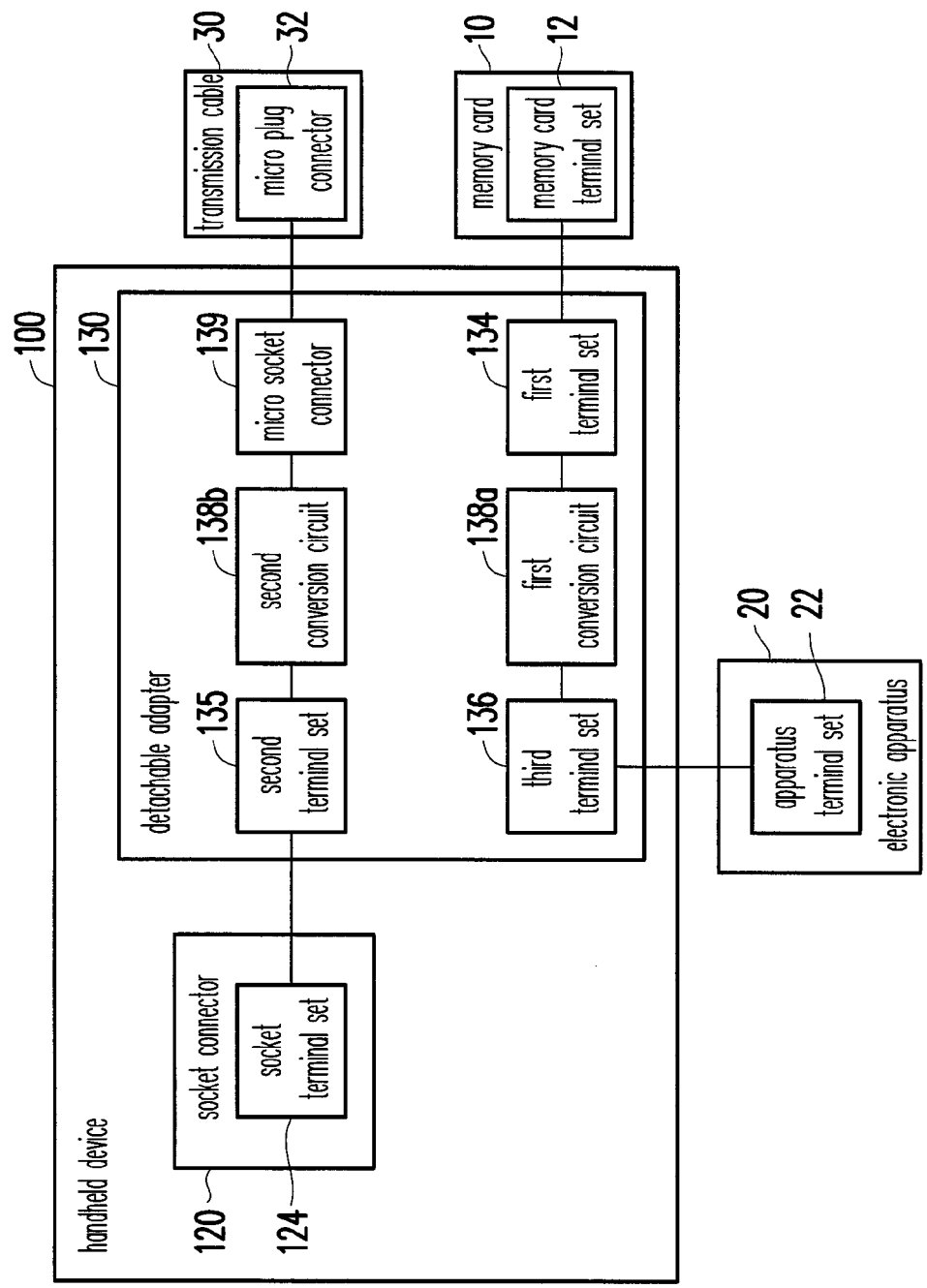
FIG. 4 is a block diagram of a circuit of the handheld device of FIG. 1.

When the adapter body 132 is inserted into an electronic apparatus 20 (see FIG. 4), the third terminal set 136 contacts an apparatus terminal set 22 of the electronic apparatus 20 (see FIG. 4). The electronic apparatus 20 is, for example, a desktop computer or a notebook computer. In the present embodiment, the third terminal set 136 may be a universal serial bus (USB) terminal set.

Specifically, when it is desired to read data in the memory card 10 inside the handheld device 100 using the electronic apparatus 20, the user needs detach the adapter body 132 from the socket body 122 and then insert the adapter body 132 into the electronic apparatus 20 with the third terminal set 136 contacting the apparatus terminal set 22, such that the memory card 10 is electrically connected to the electronic apparatus 20.

In other words, when the detachable adapter 130 accommodates the memory card 10 and is assembled with the electronic apparatus 20, the detachable adapter 130 may serve as a conventional card reader. On the other hand, when the detachable adapter 130 accommodates the memory card 10 and is disposed inside the handheld device 100, the detachable adapter 130 may serve as a conventional memory card connector. In this way, the user may conveniently read data in the memory card 10 without the use of any additional transmission cable, additional card reader or wireless transmission.

FIG. 4 is a block diagram of a circuit of the handheld device of FIG. 1. Referring to FIG. 4, the detachable adapter 130 further includes a first conversion circuit 138a. The first conversion circuit 138a is disposed inside the adapter body 132 (shown in FIG. 2), and the first terminal set 134 and the third terminal set 136 are electrically coupled to the first conversion circuit 138a. The first terminal set 134 is a Micro-SD terminal set, and the third terminal set 136 is a USB terminal set. As such, two types of terminal sets of different specifications (i.e. the first terminal set 134 and the third terminal set 136) may be electrically coupled to the first conversion circuit 138a for signal conversion.

Referring to FIG. 1, FIG. 3 and FIG. 4, in addition, the detachable adapter 130 further includes a second conversion circuit 138b and a micro socket connector 139. The micro socket connector 139 is disposed on the adapter body 132. The second conversion circuit 138b is disposed inside the adapter body 132, and the second conversion circuit 138b is electrically coupled to the micro socket connector 139 and the second terminal set 135 for signal conversion. The micro socket connector 139 is a micro universal serial bus (Micro-USB) socket.

Specifically, when the memory card terminal set 12 contacts the first terminal set 134 and the adapter body 132 is assembled to the socket body 122 (shown in FIG. 2), the user my utilize a transmission cable 30 having a micro plug connector 32 (e.g. a Micro-USB plug) at one end thereof plugged into the micro socket connector 139 and the other end of the transmission cable 30 connected to the electronic apparatus 20. As such, the user may still read the data in the memory card 10 inside the handheld device 100 by using the transmission cable and electronic apparatus 20. In addition, the second terminal set 135 of the detachable adapter 130 and the terminal set (not shown) of the micro socket connector 139 may be electrically coupled through the second conversion circuit 138b, such that the two terminal sets of different specifications are electrically coupled.

Figure 5:
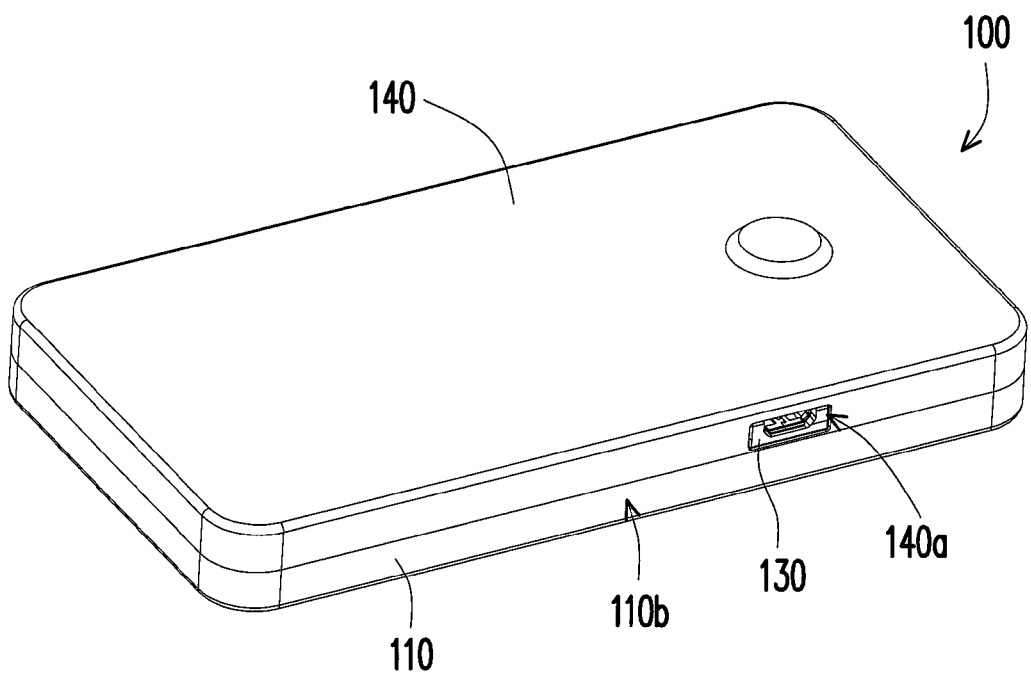
FIG. 5 is a perspective assembled view of the device body and protective cover of FIG. 1.

FIG. 5 is a perspective assembled view of the device body and a protective cover of FIG. 1. Referring to FIG. 1 and FIG. 5, one end of the first accommodating cavity 110a communicates through a side surface 110b of the device body 110. When the adapter body 132 is assembled to the socket body 122, one end of the adapter body 132 is flush with the side surface 110b of the device body 110. As such, the detachable adapter 130 has no protrusion structure relative to the side surface 110b of the device body 110, thus avoiding the risk of hurting the user hand when using the handheld device 100. In addition, the handheld device 100 may further include a protective cover 140. The protective cover 140 has an opening 140a facing the side surface 110b of the device body 110. When the protective cover 140 is assembled to device body 110, the opening 140 of the protective cover 140 exposes a portion of the detachable adapter 130. Therefore, the user may connect the transmission cable to the micro socket connector 139 through the opening 140a of the protective cover 140.

Figure 6A:
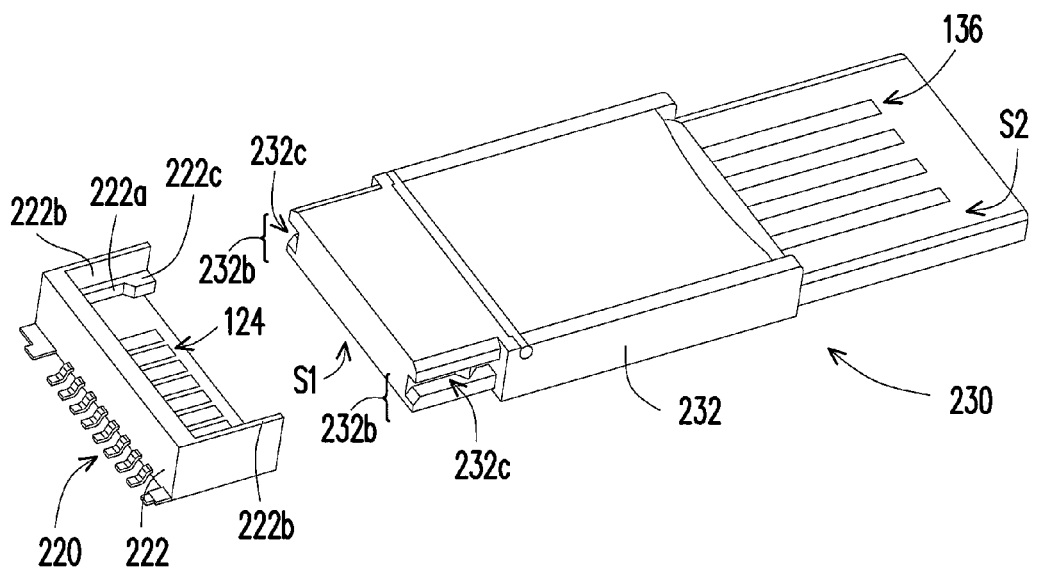
FIG. 6A is an exploded view of a socket connector and a detachable adapter according to another embodiment of the present disclosure.
Figure 6B:
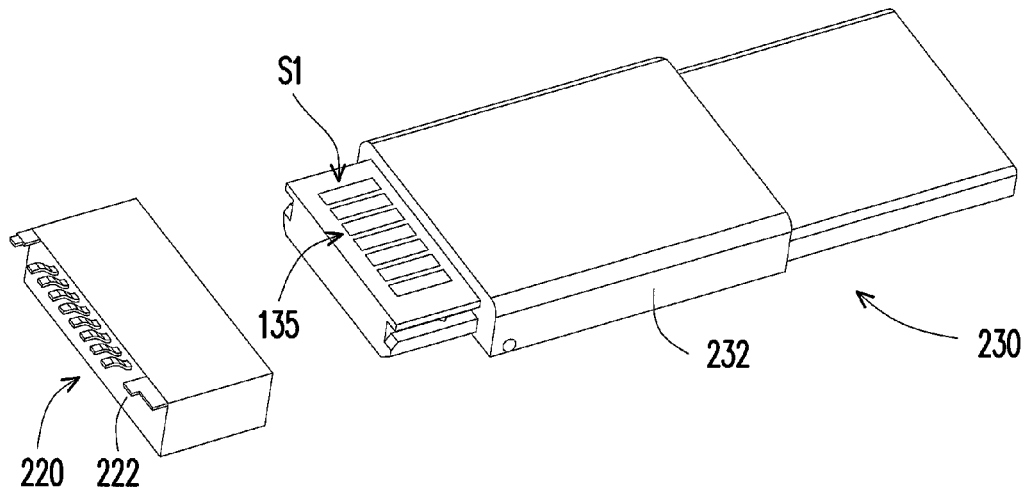
FIG. 6B is an exploded view of the socket connector and detachable adapter of FIG. 6A, viewed from another angle.

FIG. 6A is an exploded view of a socket connector and a detachable adapter according to another embodiment of the present disclosure. FIG. 6B is an exploded view of the socket connector and detachable adapter of FIG. 6A, viewed from another angle. Referring to FIG. 2, FIG. 6A and FIG. 6B, the socket connector 220 and detachable adapter 230 of this embodiment are similar to the socket connector 120 and detachable adapter 130 of FIG. 2, and only the differences therebetween are described herein. The same reference numerals refer to the same components, explanation of which is not repeated herein. In FIG. 2, the third terminal set 136 and second terminal set 135 are disposed on a surface S of the adapter body 132, and the third terminal set 136 and second terminal set 135 are disposed adjacent each other and at one end of the adapter body 132. In FIG. 6, the second terminal set 135 is disposed on a first surface S1 of the adapter body 232, the third terminal set 136 is disposed on a second surface S2 opposite to the first surface S1, and the second terminal set 135 and third terminal set 136 are disposed away from each other and at opposite ends of the adapter body 232.

The socket body 222 further has a first positioning structure 222a, and the adapter body 232 further has a second positioning structure 232b corresponding to the first positioning structure 222a. The first positioning structure 222a is disposed on two sidewalls 222b of the socket body 222, and the second positioning structure 232b is disposed at two sides of the first surface S1 of the adapter body 232. The second positioning structure 232b is used to engage the first positioning structure 222a. Specifically, the first positioning structure 222a includes a convex portion 222c, the second positioning structure 232b includes a concave portion 232c, and each convex portion 222c is adapted to move within a corresponding concave portion 232c. This arrangement may be used to position the detachable adapter 230 to the socket connector 220.

Figure 7:
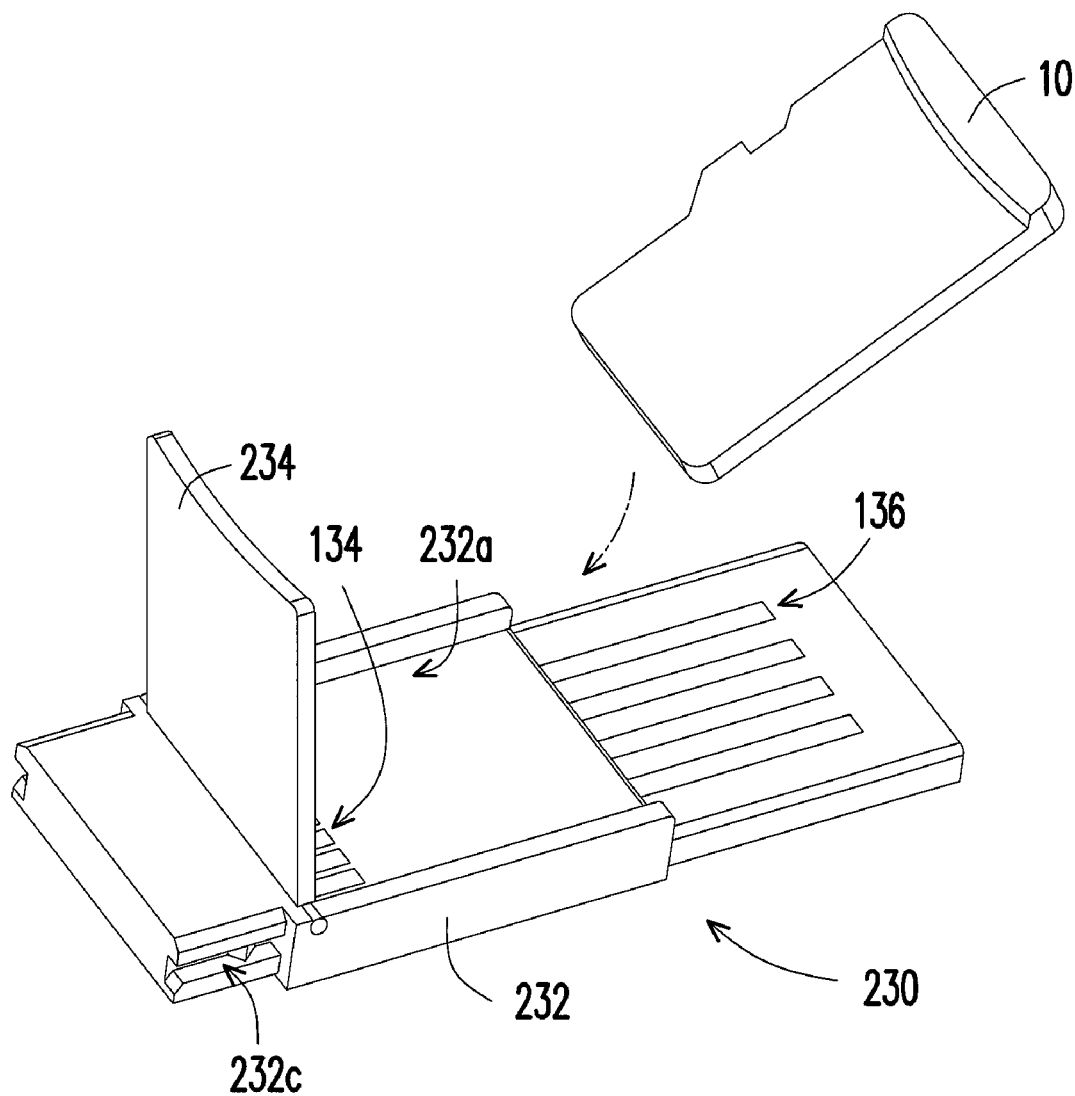
FIG. 7 is an exploded view of the detachable adapter and memory card of FIG. 6A.

FIG. 7 is an exploded view of the detachable adapter and the memory card of FIG. 6A. Referring to FIG. 6A and FIG. 7, in the present embodiment, the detachable adapter 230 includes a pivot cover 234 that is pivotally connected to the adapter body 232. When the memory card 10 is placed in the second accommodating cavity 232a, the pivot cover 234 may be pivoted to a closed position relative to the adapter body 232 such that the memory card 10 is accommodated in the second accommodating cavity 232a of the adapter body 232.

In summary, the detachable adapter of the present disclosure may accommodate a memory card and may be adapted to be disposed in a handheld device or assembled to another electronic apparatus. As such, when the detachable adapter is assembled to another electronic apparatus, the detachable adapter may serve as a card reader. Therefore, the user may read data in the memory card accommodated in the detachable adapter by connecting the detachable adapter that is detached from the handheld device to the electronic apparatus, without the use of any additional transmission cable, additional card reader or wireless transmission.

It will be apparent to those skilled in the art that various modifications and variations may be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A detachable adapter adapted to be disposed inside a handheld device and adapted to accommodate a memory card, the handheld device comprising a socket connector, the memory card having a memory card terminal set, and the socket connector having a socket body and a socket terminal set disposed at the socket body, the detachable adapter comprising:
    an adapter body, having an accommodating cavity for accommodating the memory card;
    a first terminal set, disposed in the accommodating cavity;
    a second terminal set, disposed on the adapter body; and
    a third terminal set, disposed on the adapter body;
    wherein when the memory card is accommodated in the accommodating cavity, the first terminal set contacts the memory card terminal set, when the adapter body is assembled to the socket body, the second terminal set contacts the socket terminal set, and when the adapter body is inserted into an electronic apparatus, the third terminal set contacts an apparatus terminal set of the electronic apparatus.

2. The detachable adapter according to claim 1, further comprising:
    a first conversion circuit, disposed in the adapter body, wherein the first terminal set and the third terminal set are electrically coupled to the first conversion circuit.

3. The detachable adapter according to claim 2, wherein the first terminal set is a micro secure digital terminal set, and the third terminal set is a universal serial bus terminal set.

4. The detachable adapter according to claim 1, wherein the first terminal set is a micro secure digital terminal set, and the second terminal set is a micro secure digital terminal set.

5. The detachable adapter according to claim 1, further comprising:
    a micro socket connector, disposed on the adapter body; and
    a second conversion circuit, disposed in the adapter body and electrically coupled to the micro socket connector and the second terminal set.

6. The detachable adapter according to claim 5, wherein the micro socket connector is a micro universal serial bus socket.

7. The detachable adapter according to claim 1, wherein the second terminal set and the third terminal set are disposed on a surface of the adapter body, and the second terminal set and the third terminal set are disposed at one end of the adapter body.

8. The detachable adapter according to claim 1, wherein the second terminal set is disposed on a first surface of the adapter body, the third terminal set is disposed on a second surface opposite to the first surface, and the second terminal set and the third terminal set are disposed at opposite ends of the adapter body.

9. The detachable adapter according to claim 8, wherein the socket body further has a first positioning structure, the adapter body further has a second positioning structure corresponding to the first positioning structure, the first positioning structure is disposed at two sidewalls of the socket body, the second positioning structure is disposed at two sides of the first surface of the adapter body, and the second positioning structure is adapted to engage the first positioning structure.

10. The detachable adapter according to claim 9, wherein the first positioning structure comprises a convex portion, the second positioning structure comprises a concave portion, and the convex portion is adapted to move within the concave portion.

11. A handheld device adapted to accommodate a memory card, the memory card having a memory card terminal set, the handheld device comprising:
    a device body, having a first accommodating cavity;
    a socket connector, disposed in the first accommodating cavity, the socket connector having a socket body and a socket terminal set disposed at the socket body;
    a detachable adapter comprising:
        an adapter body, having a second accommodating cavity for accommodating the memory card;
        a first terminal set, disposed in the second accommodating cavity;
        a second terminal set, disposed on the adapter body; and
        a third terminal set, disposed on the adapter body;
        wherein when the memory card is accommodated in the second accommodating cavity, the first terminal set contacts the memory card terminal set, when the adapter body is assembled to the socket body, the second terminal set contacts the socket terminal set, and when the adapter body is inserted into an electronic apparatus, the third terminal set contacts an apparatus terminal set of the electronic apparatus.

12. The handheld device according to claim 11, wherein the detachable adapter further comprises:
    a first conversion circuit, disposed in the adapter body, and the first terminal set and the third terminal set are electrically coupled to the first conversion circuit.

13. The handheld device according to claim 12, wherein the first terminal set is a micro secure digital terminal set, and the third terminal set is a universal serial bus terminal set.

14. The handheld device according to claim 11, wherein the first terminal set is a micro secure digital terminal set, and the second terminal set is a micro secure digital terminal set.

15. The handheld device according to claim 11, wherein the detachable adapter further comprises:
    a micro socket connector, disposed on the adapter body; and
    a second conversion circuit, disposed in the adapter body and electrically coupled to the micro socket connector and the second terminal set.

16. The handheld device according to claim 15, wherein the micro socket connector is a micro universal serial bus socket.

17. The handheld device according to claim 11, wherein the second terminal set and the third terminal set are disposed on a surface of the adapter body, and the second terminal set and the third terminal set are disposed at one end of the adapter body.

18. The handheld device according to claim 11, wherein the second terminal set is disposed on a first surface of the adapter body, the third terminal set is disposed on a second surface opposite to the first surface, and the second terminal set and the third terminal set are disposed at opposite ends of the adapter body.

19. The handheld device according to claim 18, wherein the socket body further has a first positioning structure, the adapter body further has a second positioning structure corresponding to the first positioning structure, the first positioning structure is disposed at two sidewalls of the socket body, the second positioning structure is disposed at two sides of the first surface of the adapter body, and the second positioning structure is adapted to engage the first positioning structure.

20. The handheld device according to claim 19, wherein the first positioning structure comprises a convex portion, the second positioning structure comprises a concave portion, and the convex portion is adapted to move within the concave portion.

21. The handheld device according to claim 11, wherein one end of the first accommodating cavity communicates through a side surface of the device body, and when the adapter body is assembled to the socket body, one end of the adapter body is flush with the side surface.

22. The handheld device according to claim 21, further comprising a protective cover, wherein the protective cover has an opening facing the side surface, the protective cover is assembled to the device body, and the opening exposes a portion of the detachable adapter.

* * * * *